(12) United States Patent
Hibi et al.

(10) Patent No.: US 8,366,322 B2
(45) Date of Patent: Feb. 5, 2013

(54) SHAFT MEMBER FOR FLUID DYNAMIC BEARING DEVICE

(75) Inventors: Kenji Hibi, Kuwana (JP); Yasuhiro Yamamoto, Kuwana (JP)

(73) Assignee: NTN Corporation, Osaka-shi, Osaka (JP)

( * ) Notice: Subject to any disclaimer, the term of this patent is extended or adjusted under 35 U.S.C. 154(b) by 0 days.

(21) Appl. No.: 13/281,011

(22) Filed: Oct. 25, 2011

(65) Prior Publication Data

US 2012/0093447 A1    Apr. 19, 2012

Related U.S. Application Data

(62) Division of application No. 12/160,654, filed as application No. PCT/JP2006/325894 on Dec. 26, 2006, now Pat. No. 8,104,963.

(30) Foreign Application Priority Data

Jan. 19, 2006 (JP) ................... 2006-011592
Jan. 23, 2006 (JP) ................... 2006-013977

(51) Int. Cl.
  *F16C 32/06* (2006.01)
  *F16C 33/00* (2006.01)
(52) U.S. Cl. ........ 384/115; 384/107; 384/123; 384/625; 384/913
(58) Field of Classification Search .................. 384/100, 384/107, 114–115, 123, 625, 913; 264/629, 264/632, 667; 418/175; 428/310
See application file for complete search history.

(56) References Cited

U.S. PATENT DOCUMENTS

| | | | |
|---|---|---|---|
| 4,594,062 A * | 6/1986 | Sakamaki et al. | 418/173 |
| 4,938,614 A | 7/1990 | Imamura et al. | |
| 5,176,455 A | 1/1993 | Stangeland | |
| 5,181,235 A * | 1/1993 | Ono et al. | 378/133 |
| 5,730,928 A | 3/1998 | Ghosh et al. | |
| 5,835,124 A * | 11/1998 | Fukita et al. | 310/90.5 |
| 5,998,898 A | 12/1999 | Fukutani et al. | |
| 6,049,151 A | 4/2000 | Suzuki et al. | |
| 6,410,125 B1 * | 6/2002 | Brenner et al. | 428/216 |
| 6,474,751 B1 * | 11/2002 | Yamaguchi et al. | 303/116.4 |
| 6,712,513 B2 | 3/2004 | Tanaka et al. | |
| 7,021,106 B2 * | 4/2006 | Jesson et al. | 72/283 |
| 7,284,908 B2 | 10/2007 | Yamamoto et al. | |
| 7,582,996 B2 | 9/2009 | Yamamoto et al. | |
| 2002/0172438 A1 * | 11/2002 | Nakagawa et al. | 384/107 |

(Continued)

FOREIGN PATENT DOCUMENTS

DE    10059903 A1 *   6/2002
JP    51101736 A *    9/1976

(Continued)

OTHER PUBLICATIONS

International Search Report of PCT/JP2006/325894, date of mailing Apr. 10, 2007.

(Continued)

*Primary Examiner* — Marcus Charles
(74) *Attorney, Agent, or Firm* — Westerman, Hattori, Daniels & Adrian, LLP

(57) ABSTRACT

A shaft member for a fluid dynamic bearing device that has a recess to cause a dynamic pressure effect of a fluid in a bearing clearance, which is formed on it by rolling, and where a surface layer portion of the recess and a surface layer portion of a surrounding region of the recess has a nitride layer, and where nitrogen is diffused and penetrated in a material of the shaft member that is formed by nitriding after the rolling.

4 Claims, 11 Drawing Sheets

U.S. PATENT DOCUMENTS

| | | |
|---|---|---|
| 2003/0169952 A1 | 9/2003 | Yamashita et al. |
| 2005/0094906 A1 | 5/2005 | Satoh |
| 2006/0008190 A1 | 1/2006 | Hamada et al. |
| 2009/0046960 A1 | 2/2009 | Hibi et al. |

FOREIGN PATENT DOCUMENTS

| | | | |
|---|---|---|---|
| JP | 61-205383 A | | 9/1986 |
| JP | 06-060487 A | | 3/1994 |
| JP | 06-158357 A | | 6/1994 |
| JP | 06-341438 A | | 12/1994 |
| JP | 7-20397 | | 1/1995 |
| JP | 07-114766 A | | 5/1995 |
| JP | 07-156060 A | | 6/1995 |
| JP | 08-196056 A | | 7/1996 |
| JP | 2001-082482 A | | 3/2001 |
| JP | 2001-090727 A | | 4/2001 |
| JP | 2001342981 A | * | 12/2001 |
| JP | 2002-048132 A | | 2/2002 |
| JP | 2002310159 A | * | 10/2002 |
| JP | 2003-239951 A | | 8/2003 |
| JP | 2004204890 A | * | 7/2004 |
| JP | 2004-225096 A | | 8/2004 |
| JP | 2005-095998 A | | 4/2005 |
| JP | 2006-329262 A | | 12/2006 |

OTHER PUBLICATIONS

Japanese Office Action dated Oct. 25, 2011, issued in corresponding Japanese Patent Application No. 2006-013977.

* cited by examiner

SHAFT MEMBER FOR FLUID DYNAMIC BEARING DEVICE

CROSS-REFERENCE TO RELATED APPLICATION

This application is a divisional application of U.S. Pat. No. 8,104,963 issued on Jan. 31, 2012, formerly U.S. patent application Ser. No. 12/160,654 filed on Jul. 11, 2008, which is a National Stage Application of PCT/JP2006/325894 filed on Dec. 26, 2006 which is based on and claims the benefit of priority from Japanese Patent Application Nos. 2006-011592 filed on Jan. 19, 2006 and 2006-013977 filed on Jan. 23, 2006, the entire contents of which are incorporated here by reference.

TECHNICAL FIELD

The present invention relates to a shaft member for a fluid dynamic bearing device.

BACKGROUND ART

A fluid dynamic bearing device relatively rotatably supports a shaft member by a dynamic pressure effect of a fluid caused in a bearing clearance. Recently, by taking advantage of its excellent rotational accuracy, high-speed rotation property, quietness, and the like, the fluid dynamic bearing device is suitably used as a bearing device for a motor to be mounted to various electrical apparatuses such as information equipment. Specifically, the fluid dynamic bearing device is used as a bearing device for a spindle motor mounted on information equipment including magnetic disk devices such as HDD, optical disk devices such as CD-ROM, CD-R/RW, and DVD-ROM/RAM, and magneto-optical disk devices such as MD and MO, and as a bearing device for motors such as a polygon scanner motor for a laser beam printer (LBP), a color wheel motor for a projector, or a fan motor.

For example, as a fluid dynamic bearing device incorporated into the spindle motor for an HDD, there is known one having a structure in which both a radial bearing portion for supporting the shaft member in a radial direction and a thrust bearing portion for supporting the shaft member in a thrust direction are structured by a dynamic pressure bearing. In this case, in one of an inner peripheral surface of a bearing sleeve and an outer peripheral surface of a shaft member opposed thereto, a dynamic pressure groove serving as a dynamic pressure generation portion is formed, and a radial bearing portion is often formed in a radial bearing clearance therebetween. Further, in one of a one end surface of a flange portion provided to the shaft member and an end surface of the bearing sleeve opposed thereto, the dynamic pressure groove is formed, and a thrust bearing portion is often formed in a thrust bearing clearance therebetween (for example, see Patent Document 1: JP 2003-239951 A).

The dynamic pressure groove is formed, for example, in a herringbone shape or a spiral shape, or a multi-arc or step-like arrangement in an outer peripheral surface of the shaft member. As methods of forming the dynamic pressure groove of this type, there are known, for example, cutting (see, for example, Patent Document 2: JP 08-196056 A) and etching (see, for example, Patent Document 3 JP 06-158357 A).

Further, as a method of forming the dynamic pressure groove, which enables reduction in material cost and machining cost compared to the cutting and etching, there is known rolling, for example. In this case, by applying predetermined heating after the rolling, a surface hardness of the material is often increased (see, for example, Patent Document 4 JP 07-114766 A).

DISCLOSURE OF THE INVENTION

Problem to be Solved by the Invention

However, normally, the heating is performed at high temperature, so deformation of the shaft itself cannot be avoided, thereby causing a risk of deteriorating an outer peripheral surface accuracy. In particular, in a case where a groove of a micro size and high accuracy is formed, such as the dynamic pressure groove, there is a high risk of the deformation of the shaft at the time of heating affecting a shape accuracy of the dynamic pressure groove. Accordingly, for example, a depth and a shape of the dynamic pressure groove become various, and there is a risk in that a sufficient dynamic pressure effect cannot be exerted. Means disclosed in the above-mentioned document is made only for a purpose of merely increasing the surface hardness of the shaft member, and the means is not made in consideration of reduction in the outer peripheral surface accuracy due to the deformation at the time of heating.

It is an object of the present invention to provide a shaft member for a fluid dynamic bearing device, which is excellent in wear resistance and which can exert a high dynamic pressure effect.

Means for Solving the Problem

In order to solve the above-mentioned problem, the present invention provides a shaft member for a fluid dynamic bearing device, including a recess for causing a dynamic pressure effect of a fluid in a bearing clearance, which is formed on the shaft by rolling; a first hardened layer formed in a surface layer portion of the recess by the rolling; and a second hardened layer formed in a surface layer portion of a surrounding region of the recess, in which a hardness of the second hardened layer is higher by 50 Hv or more and 200 Hv or less than a hardness of the first hardened layer formed in the recess. In this case, the recess of the present invention means a section for causing the dynamic pressure effect of the fluid in the bearing clearance, and examples of a shape thereof include an axial groove shape, a circumferential groove shape, an inclined groove shape, a crossing groove shape, a groove shape continuous in an axial direction or a circumferential direction, and a depressed shape (dimple shape).

In a case where the recess is formed in a material surface by the rolling, it is preferable that the material be as soft as possible in view of workability and because a working life of rolling die is elongated. On the other hand, the shaft member as a finished product is required of high wear resistance against sliding wear with respect to a counter material, so high hardness of a surface portion of the shaft member as the finished product is preferable. The hardened layer (corresponding to the first hardened layer in the present invention) is formed in the material surface by rolling. In a machining method of this type, increase in hardness of the surface layer portion is rarely expected. On the contrary, the present invention is characterized in that an appropriate hardness difference is provided between the first hardened layer formed in the surface layer portion of the recess and the second hardened layer formed in the surface layer portion of the surrounding region of the recess. The second hardened layer is formed by plastic machining, so it is possible to avoid deformation due to heating, thereby suppressing reduction in dimensional accuracy to minimum. Further, in the surface layer portion of the surrounding region of the recess, the second hardened layer harder than the first hardened layer is provided by plastic machining other than the rolling, thereby making it possible to improve the wear resistance against the counter material. Accordingly, the shaft member for a fluid dynamic bearing device, having increased wear resistance and also capable of stably exerting a high dynamic pressure effect.

Further, the hardness difference is set to 50 Hv or more and 200 Hv or less for the following reasons. In a case where there is provided almost no hardness difference (less than 50 Hv), one of requisite characteristics, that is, the rolling workability of the material and the wear resistance of the finished product may not be satisfied. Further, when the hardness difference is too large (more than 200 Hv), there is a risk of increasing aggressiveness to the counter material rather than the wear resistance of the shaft itself, so there is a possibility of promoting wear of the counter material.

The second hardened layer can be obtained by performing barreling, for example. In this case, a bulged portion (prominence portion) formed in a circumference of the recess by the rolling can be reduced or eliminated by the barreling. Accordingly, the surface accuracy of the surrounding region of the recess which may constitute a bearing surface can be increased, to thereby stably form a lubricating film of high pressure in this region. As a matter of course, the barreling is not obligatory, and the plastic machining involving plastic deformation owing to impact (collision) is sufficient for forming the second hardened layer. Specifically, there are enumerated, for example, shot peening and shot blasting. Note that, when a consideration is given to the requisite characteristics other than provision of the hardness difference, accuracy (smoothness) of a processed surface, and facility of burr removal and chamfering, the barreling is preferable rather than the shot peening and shot blasting in which impact is received from a specific direction.

When the recess has a groove shape, in a corner portion of the groove formed by the rolling, the bulged portion, burr, or the like is caused more than a little. However, by performing the barreling as described above, the burr of this type is eliminated, and it is possible to obtain the groove having high dimensional accuracy, for generating a dynamic pressure.

As a medium used for the barreling, for example, a medium of a size such that the medium is not brought into contact with a bottom surface of the recess can be used. By performing the barreling with the medium having about this size, for example, the corner portion is appropriately chamfered. Further, fall down of the prominence portion into the recess is prevented, and the bulged portion can be reduced or eliminated. Accordingly, higher surface accuracy of the surrounding region serving as the bearing surface can be obtained.

Further, in order to achieve the above-mentioned object, the present invention provides a shaft member for a fluid dynamic bearing device, including a recess for causing a dynamic pressure effect of a fluid in a bearing clearance is formed on the shaft by rolling, in which a surface layer portion in a surrounding region of the recess includes a nitride layer formed by nitriding after the rolling. The nitriding herein includes soft nitriding for performing diffusion and penetration of nitrogen and carbon.

The nitriding is a process for performing the diffusion and penetration of nitrogen into the material, so a heating temperature in this case can be set lower (for example, about 500 to 600° C.) than a temperature at the time of other beatings such as quenching and carburizing. Accordingly, deformation at the time of heating, specifically, deformation due to heating and cooling at a temperature higher than a transformation temperature of material metal, and change of a volume involved in change of a metallographic structure are suppressed to minimum, thereby making it possible to maintain high shape accuracy of the recess or the surrounding region.

Further, a depth and a hardness of the hardened layer formed by the heating tend to be determined regardless of a size of the material and depending on a process temperature or a process time period. Accordingly, when an attempt is made to achieve both downsizing of the material and holding a predetermined surface hardness, it is inevitable that a ratio of the hardened layer to an unhardened layer increases. As a result, the material (shaft member) itself becomes brittle against the deformation, thereby resulting in reduction in durability. On the other hand, in the present invention, the nitride layer is formed in the surface layer portion by the nitriding. The nitriding enables to form the hardened layer (nitride layer) which is extremely thinner than those by the other beatings, so with a toughness (durability against deformation) of the shaft member being secured, only the hardness of the surface layer portion can be increased.

Further, in the nitriding of this type, as the heating temperature becomes lower, the nitride layer depth is reduced, and the hardness thereof tends to increase. Accordingly, the nitriding according to the present invention can be regarded as extremely suitable means in a case of hardening only the surface layer portion of the shaft member as a small part as described above.

Further, after forming the recess by rolling, in addition to the nitriding, the barreling can be applied thereto. In this case, at least a partial region of a surface of the surface layer portion formed of the nitride layer has a surface processed by the barreling.

In this manner, after forming the recess by rolling, the nitriding and the barreling are applied thereto, thereby making it possible to avoid deformation caused by the heating to suppress reduction in shape accuracy of the recess and the circumferential region thereof to minimum, and also making it possible to reduce or eliminate the prominence portion (bulged portion) by the barreling, which is formed in the surrounding region of the recess by the rolling. Accordingly, the shape accuracy of the recess or the surrounding region surface serving as the bearing surface can be further enhanced, to enable further enhancement of bearing performance.

In the case where the surface layer portion of the surrounding region is structured of the nitride layer by the nitriding after the rolling, the hardness of the lower layer region of the surface layer portion is preferably equal to or less than 400 Hv. With the hardness of this degree, the rolling workability of the recess can be enhanced, and the deformation resistance at the time of rolling is small, so the working life of the rolling die can also be elongated.

To the shaft member for a fluid dynamic bearing device according to any one of the above inventions, the fluid dynamic bearing device including this shaft member, for example, can be preferably applied.

As described above, the present invention can provide a shaft member for a fluid dynamic bearing device, which is excellent in wear resistance and which can exert a high dynamic pressure effect.

BEST MODE FOR CARRYING OUT THE INVENTION

Hereinafter, a first embodiment of the present invention is described with reference to FIGS. 1 to 8.

Figure 1:
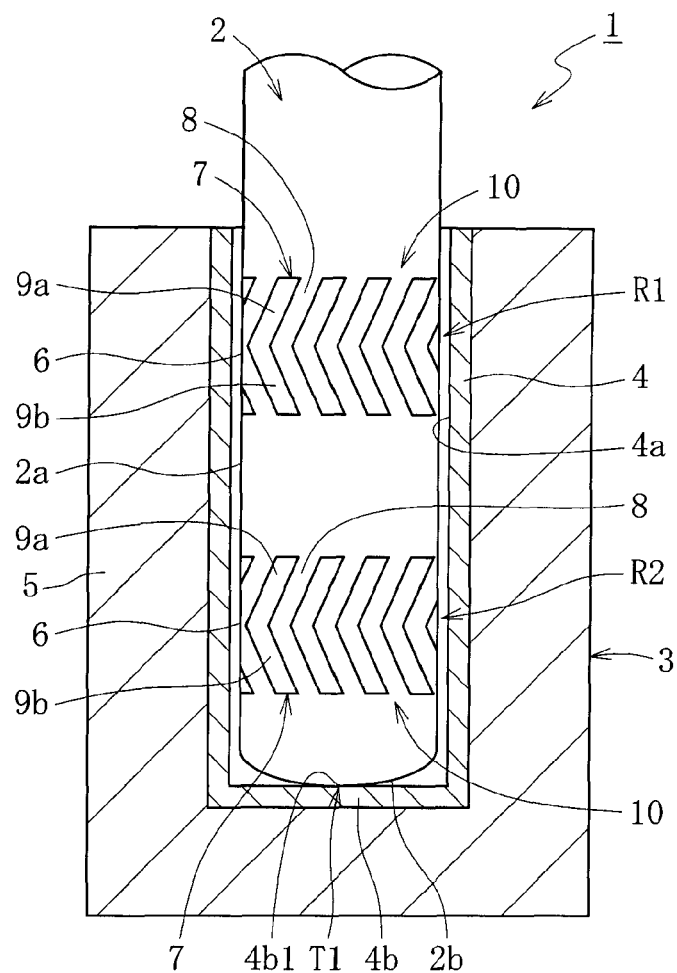
FIG. 1 is a sectional view of a fluid dynamic bearing device according to a first embodiment of the present invention.

FIG. 1 illustrates a sectional view of a fluid dynamic bearing device 1 according to a first embodiment of the present invention. In FIG. 1, the fluid dynamic bearing device 1 includes a shaft member 2 and a bearing member 3 having an inner periphery into which the shaft member 2 can be inserted.

In this embodiment, the bearing member 3 is a bottomed cylinder body including an electroformed portion 4 and a molded portion 5. The electroformed portion 4 provided integrally with or separately from a master is inject-molded of a resin as an insert member in an integrated fashion. An inner peripheral surface 4a of the electroformed portion 4, which is opposed to an outer peripheral surface 2a of the shaft member 2 forms a complete-round shape.

The shaft member 2 is a shaft having a fixed diameter, and is made of, for example, metal materials having a relatively high workability (hardness of about 300 Hv to 400 Hv is desirable), such as carbon steel, stainless steel, alloy steel of various types. As a matter of course, there may be used a material whose hardness is increased to the above-mentioned numerical value range by quenching or the like.

In an entire surface or a partial region of the outer peripheral surface 2a of the shaft member 2, there are formed a plurality of recesses 7 for causing a dynamic pressure effect of a lubricating oil in a radial bearing clearance 6 between the outer peripheral surface 2a and the inner peripheral surface 4a of the electroformed portion 4. In this embodiment, each of the recesses 7 includes an inclined groove 9a and an inclined groove 9b which are inclined so as to be continuous with or adjacent to each other on one end side in a circumferential direction and so as to be away from each other at another end side in the circumferential direction. The plurality of recesses 7 are aligned at predetermined intervals in the circumferential direction to form a so-called herringbone shape. In this case, the recesses 7 (inclined grooves 9a and 9b) and a surrounding region 8 thereof constitute a dynamic pressure generation portion 10 for causing the dynamic pressure effect of the lubricating oil in the radial bearing clearance 6. Further, in this embodiment, the dynamic pressure generation portions 10 of the above-mentioned structure are provided in two positions away from each other in an axial direction.

One end surface 2b of the shaft member 2 forms a substantially spherical surface. In a state where the shaft member 2 is inserted into the inner periphery of the bearing member 3, the one end surface 2b abuts on an upper end surface 4b1 of a bottom portion 4b of the electroformed portion 4 opposed thereto.

The lubricating oil is supplied from an air release side of the radial bearing clearance 6 between the bearing member 3 and the shaft member 2. As a result, the fluid dynamic bearing device 1 having a bearing inner space which includes the radial bearing clearance 6 and which is filled with the lubricating oil is achieved.

In the fluid dynamic bearing device 1 of the above-mentioned structure, at a time of relative rotation of the shaft member 2, in the radial bearing clearance 6 between the dynamic pressure generation portions 10 and 10 provided on the outer peripheral surface 2a of the shaft member 2 and the inner peripheral surface 4a of the electroformed portion 4 corresponding to the dynamic pressure generation portions 10 and 10, the dynamic pressure effect of the lubricating oil is caused. As a result, there are formed a first radial bearing portion R1 and a second radial bearing portion R2 each for supporting the shaft member 2 such that the shaft member 2 can relatively rotate in a radial direction.

Further, at the time of relative rotation of the shaft member 2, the one end surface 2b of the shaft member 2 is supported (pivotally supported) by the upper end surface 4b1 of the bottom portion 4b while brought into contact therewith. Accordingly, there is formed a thrust bearing portion T1 for supporting the shaft member 2 such that the shaft member 2 can relatively rotate in a thrust direction.

Hereinafter, an example of manufacturing processes of the shaft member 2 having the outer peripheral surface 2a provided with the recesses 7 is described with reference to FIGS. 2 to 4.

Figure 2:
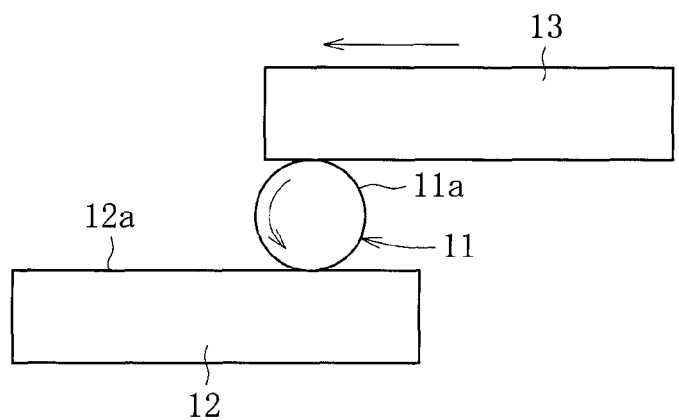
FIG. 2 is a view conceptually illustrating a process of forming a recess in a shaft member for the dynamic pressure bearing by rolling according to a first structural example of the first embodiment of the present invention.
Figure 3A:
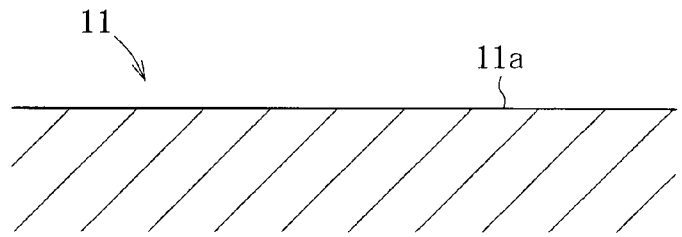
FIG. 3A is a sectional view of an outer peripheral surface layer portion of the shaft member before the rolling.

FIG. 2 is a view conceptually illustrating a process of forming the recesses 7 by rolling having the shape illustrated in FIG. 1 in an outer peripheral surface 11a of a shaft material 11 made of the above-mentioned materials. Of a pair of rolling dice 12 and 13 (flat dice in this illustrated example), an opposed surface 12a of the first rolling die 12 is provided with convex portions (not shown) having a shape corresponding to the recesses 7 to be formed by being transferred onto the shaft material 11. As illustrated in FIG. 3A, in a state before the rolling, the outer peripheral surface 11a of the shaft material 11 is smooth.

In a state where the shaft material 11 is sandwiched between the pair of rolling dice (flat dice in this illustrated example) 12 and 13, the second rolling die 13 is allowed to slide relatively to the first rolling die 12. Accordingly, the shaft material 11 is pressed and rolls on a convex portion-forming region (not shown) of the first rolling die 12. As a result, from the first rolling die 12 side, the recesses 7 (dynamic pressure generation portion 10) of a shape illustrated in FIG. 1, for example, are formed on the shaft material 11 by the rolling.

Figure 3B:
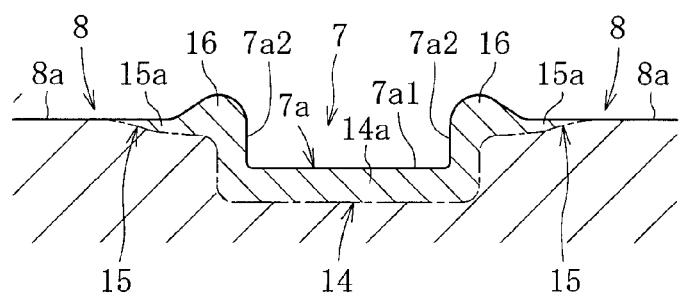
FIG. 3B is a sectional view of the surface layer portion of the recess and a surrounding region thereof after the rolling.
Figure 3C:
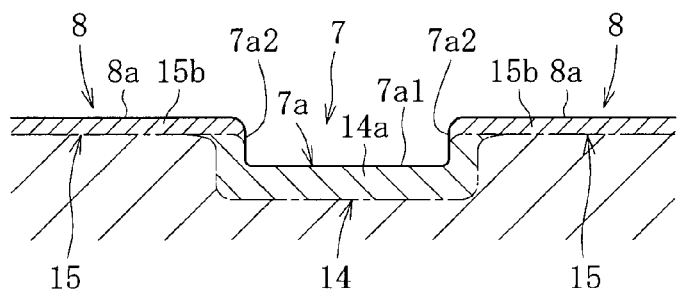
FIG. 3C is a sectional view of the surface layer portion of the recess and the surrounding region thereof after barreling.

In this case, as illustrated in FIG. 3B, in a surface layer portion 14 of the recess 7 formed in the outer peripheral surface 11a of the shaft material 11, a first hardened layer 14a is formed by the rolling. In this embodiment, at the same time, also in a partial region (surrounding region of the recess 7) of a surface layer portion 15 of the surrounding region 8 of the recess 7, a first hardened layer 15a is formed by the rolling.

Further, along with the rolling, an original thickness portion of the recess 7 is pushed out to the circumference thereof. As a result, as illustrated in FIG. 3B, a prominence (bulged portion 16) is generated in a section close to the recess 7 of the surrounding region 8.

After the recesses 7 are formed by rolling in the shaft material 11, the shaft material 11 is applied with barreling (for example, centrifugal barrel, fluid barrel, or barreling obtained by combining those). As a result, the bulged portions 16 formed on the surrounding region 8 are crushed to be reduced or eliminated, thereby making a surface 8a of the surrounding region 8 to be a uniformly smooth surface as illustrated, for example, in FIG. 3C. Particularly, as described in this embodiment, by using the shaft material made of the metal material relatively superior in workability (hardness of 300 Hv to 400 Hv), a degree (height) of the bulged portions 16 generated at the time of forming the recess 7 by rolling is suppressed. Accordingly, elimination of the bulged portions 16 by the barreling can easily be performed.

The recesses 7 are adopted for causing the dynamic pressure effect of the lubricating oil in the radial bearing clearance 6, so a size thereof is determined depending on a width of the radial bearing clearance 6. On the other hand, in order to effectively perform the barreling of this type with respect to the surface 8a of the surrounding region 8 constituting a bearing surface, a medium of a certain size is required. Accordingly, a ratio of causing impact by the medium on a surface 7a (bottom surface 7a1 or inner side surface 7a2) of the recess 7 is lower than a ratio of causing impact by the medium on the surface 8a of the surrounding region 8. Therefore, work hardening owing to the impact with the medium occurs mainly on the surface layer portion 15 of the surrounding region 8, in the surrounding region 8, a second hardened layer 15b is formed by the barreling. In this embodiment, on a lower surface side of the second hardened layer 15b, almost no first hardened layer 15a remains (see FIG. 3C). A hardness of the second hardened layer 15b is higher by 50 Hv or more and 200 Hv or less than a hardness of the first hardened layer 14a.

As described above, by applying barreling to the shaft material 11 after the rolling, there is obtained the shaft member 2 having the second hardened layer 15b harder than the first hardened layer 14a, the second hardened layer 15b being formed in an outermost surface layer portion including the surface 8a of the surface layer 15 of the surrounding region 8. As a result, a hardness of the surface 8a of the surrounding region 8 serving as the bearing surface is surely improved, and rolling workability of the shaft material 11 and bearing surface accuracy (smoothness of the surface 8a of the surrounding region 8) of the shaft member 2 as a finished product can be enhanced. Accordingly, it is possible to obtain the shaft member 2 for the fluid dynamic bearing device 1, having high bearing performance and wear resistance, or the fluid dynamic bearing device 1 including the shaft member 2.

Specifically, only after setting a difference in hardness between the first hardened layer 14a and the second hardened layer 15b to be equal to or less than 50 Hv, both the favorable rolling workability and high wear resistance can be obtained. Further, by setting the difference in hardness to be equal to or lower than 200 Hv, wear of the shaft member 2 is reduced and wear of the bearing member 3 (in this embodiment, wear of electroformed portion 4) can be reduced.

Further, in this embodiment, the inner peripheral surface of the bearing member 3, for forming the radial bearing clearance 6 between itself and the recess 7 (inclined grooves 9a and 9b) formed in the shaft member 2 by rolling is formed by the inner peripheral surface 4a of the electroformed portion 4. Accordingly, the inner peripheral surface 4a can be formed with high accuracy, thereby making it possible to set the radial bearing clearance 6 narrower. Further, depending on bearing performance to be required, there is no need of aligning the plurality of recesses 7 in complicated shapes (such as herringbone shape) as long as the width of the radial bearing clearance 6 can be managed to be small with high accuracy. For example, even with a dynamic pressure generation portion including the recesses 7 of a simple shape such as axial grooves 22 or dimples 32 described later, a high dynamic pressure effect can be caused in the radial bearing clearance.

Figure 4:
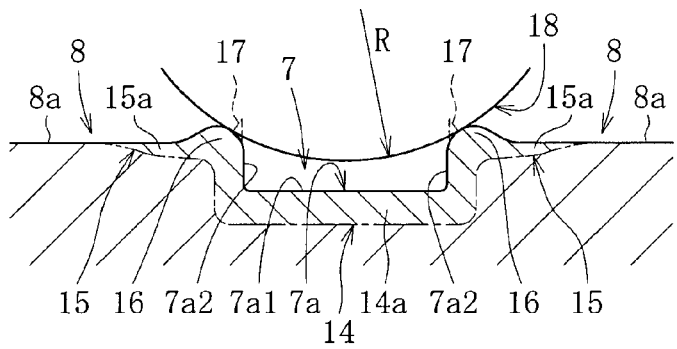
FIG. 4 is a view conceptually illustrating a dimensional relationship between a medium used for the barreling and the recess.

Further, like in this embodiment, when the groove-like recess 7 (inclined grooves 9a and 9b) is formed by the rolling, as illustrated in FIG. 4, for example, burrs 17 may be generated on a circumferential portion of the recess 7. However, by applying the barreling by using a medium of an appropriate size, the burrs 17 are eliminated, or the circumference of the recess 7 can be appropriately chamfered. As a result, at a time of relative rotation of the shaft member 2, wear of the inner peripheral surface 4a of the electroformed portion 4 serving as a sliding counter surface is reduced to minimum, or damages such as galling are avoided, thereby making it possible to enhance durability of the bearing.

As a medium used for the barreling, there may be used a medium made of various materials such as metal, ceramic, or a resin. However, in view of forming the second hardened layer 15b by the barreling, the medium having relatively high hardness is preferably used. Further, in view of maintaining the shape of the recess 7 with high accuracy, a medium 18 of a size such that the medium 18 is not brought into contact with the bottom surface 7a1 of the recess 7 is preferable. FIG. 4 illustrates an example in which a medium 18 formed in a spherical shape and having a medium diameter R such that the medium 18 is not brought into contact with the bottom surface 7a1 of the recess 7 is used to perform the barreling. However, the shape is not particularly limited to the spherical shape, and a medium having various shapes such as a polygonal shape or a bar shape may be used.

Note that, in this embodiment, as means for forming the second hardened layer 15b which is harder than the first hardened layer 14a in the shaft material 11, the barreling is taken as the example. However, processing means may be means for applying a plastic deformation to the surface layer portion 15 (in particular outermost surface layer portion) by impact (collision). For example, processing means such as shot peening or shot blasting may be used as means for forming the second hardened layer 15b.

In the above description, a structure (first structural example) of the fluid dynamic bearing device 1 according to the first embodiment of the present invention and the shaft member for the fluid dynamic bearing device 1 is described. However, the shaft member according to the present invention is not limited to this structure and other structure may be adopted. Hereinafter, a shaft member according to another structure (second structural example) of the first embodiment is described with reference to FIGS. 5 to 7. Further, a shaft member according to a third structural example is described with reference to FIG. 8.

Figure 5A:
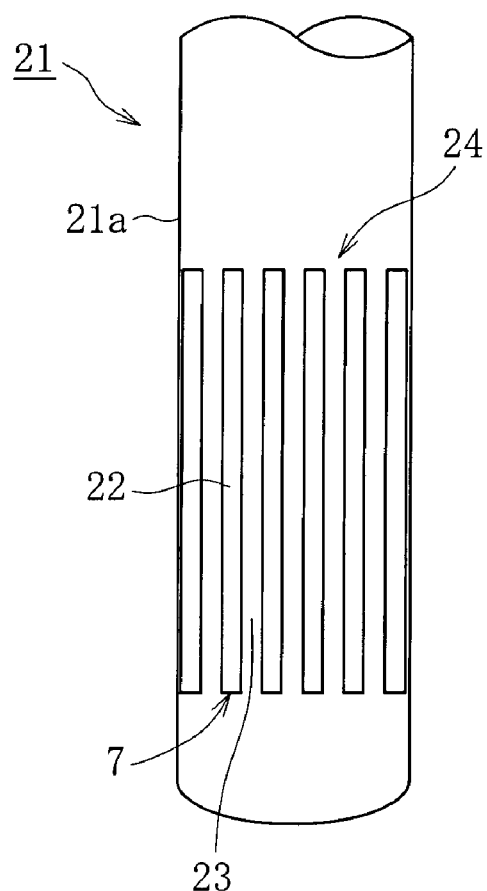
FIG. 5A is a side view of a shaft member according to a second structural example of the present invention and FIG. 5B is a sectional view taken perpendicularly to an axis of the shaft member.
Figure 5B:
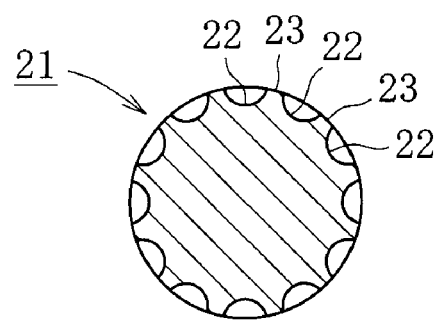

In the above-mentioned first structural example (structure exemplified in FIGS. 1 and 3), there is exemplary illustrated a case where each of the recesses 7 is formed of the inclined groove 9a and the inclined groove 9b and the recesses 7 are aligned to form the herringbone shape. However, as illustrated in FIG. 5A, for example, the axial grooves 22 may be formed as the recesses 7 in an outer peripheral surface 21a of a shaft member 21. In this case, the plurality of axial grooves 22 are formed at predetermined intervals in the circumferential direction as illustrated in FIG. 5B. The axial grooves 22 and a surrounding region 23 thereof constitute a dynamic pressure generation portion 24. Accordingly, although not shown, in a state where the shaft member 21 is inserted into the inner periphery of the bearing member 3 illustrated in FIG. 1 and the shaft member 21 is rotated relatively to the bearing member 3, the dynamic pressure effect of the lubricating oil is caused by the dynamic pressure generation portion 24 in the radial bearing clearance filled with the lubricating oil. As a result, there is formed a radial bearing portion by which the shaft member 21 is supported in the radial direction with respect to the bearing member 3 in a non-contact manner.

Figure 6A:
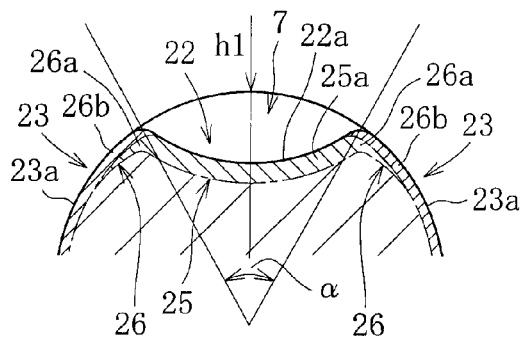
FIG. 6A is an enlarged sectional view illustrating one shape of an axial groove formed in the shaft member and FIGS. 6B to 6D are enlarged sectional views illustrating other shapes of the axial groove.

The axial grooves 22 serving as the recesses 7 are formed by rolling in the same manner as that of the first structural example. The barreling is then applied to a region constituting the dynamic pressure generation portion 24. As a result, as illustrated in FIG. 6A, for example, a first hardened layer 25a is formed in a surface layer portion 25 of the axial groove 22 by rolling the axial groove 22. Further, in an outermost layer portion of a surface layer portion 26 including a surface 23a of the surrounding region 23, a second hardened layer 26b is formed by the barreling. A hardness of the second hardened layer 26b formed in the surface layer portion 26 of the surrounding region 23 is higher by 50 Hv or more and 200 Hv or less than a hardness of the first hardened layers 25a formed on the surface layer portions 25 of the axial grooves 22. Note that, in this structural example, in the surrounding region of the axial grooves 22 of the second hardened layer 26b formed in the surface layer portion 26, a first hardened layer 26a formed by the rolling of the axial grooves 22 remains.

Also in this structural example (second structural example), the axial grooves 22 are formed as the recesses 7 by the rolling. After that, by the barreling, an appropriate difference in hardness is provided between the surface layer portion 26 of the surrounding region 23 and the surface layer portion 25 of the axial groove 22, thereby making it possible to increase a hardness of the surface 23a of the surrounding region 23 and to increase rolling workability of the axial grooves 22 and surface accuracy of the surface 23a of the surrounding region 23 constituting the bearing surface. Accordingly, the shaft member 21 for a fluid dynamic bearing device, having high bearing performance and wear resistance can be obtained.

Figure 6B:
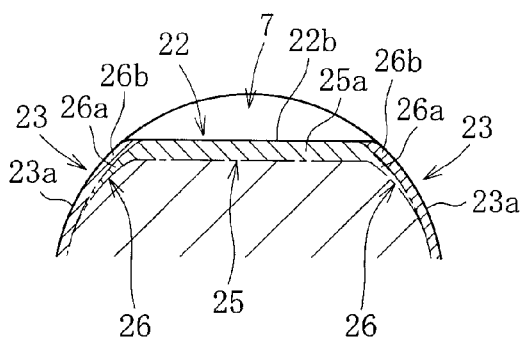
Figure 6C:
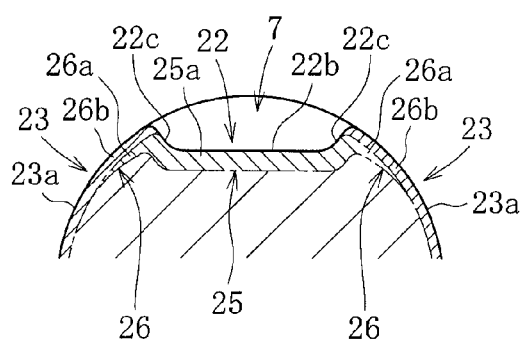
Figure 6D:
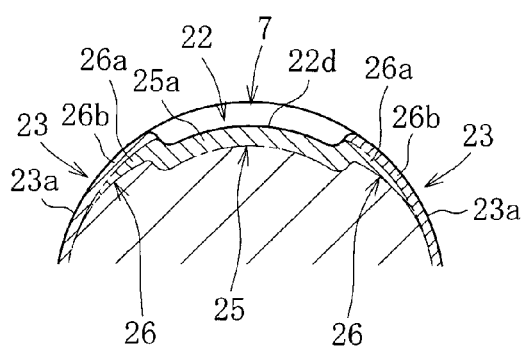

The axial grooves 22 which can be formed may have, as illustrated in FIG. 6A, a curved surface 22a whose section assumes a circular arc shape, which is convex toward an axial center, or may have, as illustrated in FIG. 6B, for example, a flat surface 22b whose section assumes a chord with respect to an arc of the outer peripheral surface 21a. Alternatively, there may also be formed, as illustrated in FIG. 6C, the axial groove 22 having a structure in which raised portions 22c are provided to both ends in the circumferential direction of the flat surface 22b so as to form a step between the flat surface 22b and the outer peripheral surface 21a, or as illustrated in FIG. 6D, the axial groove 22 having a structure in which a groove depth is constant in the axial direction and the circumferential direction and having a curved surface 22d whose section is convex toward an outer diameter side.

When a consideration is made for the dynamic pressure effect of the lubricating oil, the number of the axial grooves 22 formed in the outer periphery of the shaft member 21 is preferably three or more. Further, for the same reason, an angle of circumference α indicating a circumferential width of the axial groove 22 is preferably 10° or more and 60° or less, and a groove depth h1 of the axial groove 22 is preferably 2 μm to 20 μm. Further, in view of both torque reduction and rigidity enhancement, a ratio of an entire area of the axial grooves 22 to an entire area of the surface 23a of the surrounding region 23 is preferably 15% to 70%. (When axial lengths of the axial grooves 22 are uniform, the above-mentioned area ratio is expressed by a formula $\{\alpha/(360°-\alpha)\}$.)

Figure 7:
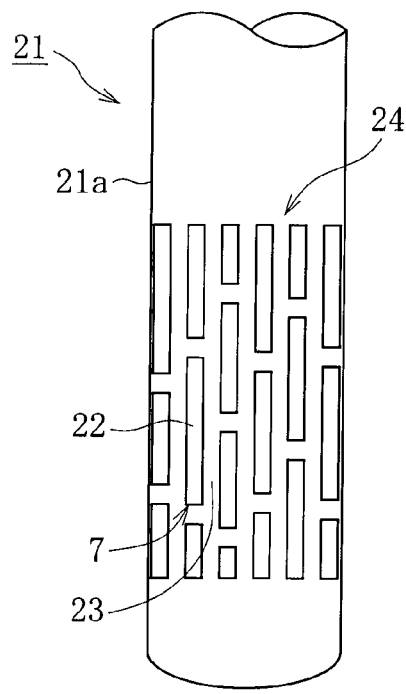
FIG. 7 is a side view illustrating a modification example of the shaft member according to the second structural example of the present invention.

Further, for the axial groove 22, there may be employed a structure in which the axial grooves 22 extend in the axial direction in an entire area in which the radial bearing portion (dynamic pressure generation portion 24) is to be formed, and a structure in which, as illustrated in FIG. 7, for example, the axial grooves 22 are provided at intervals in the axial direction. Other constructional details conform to those of the case where the axial grooves 22 are provided so as to extend in the entire axial length in the dynamic pressure generation portion 24, so descriptions of those are omitted.

Figure 8A:
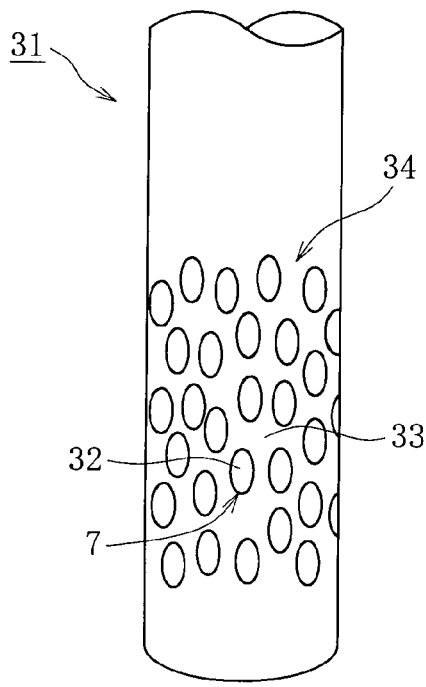
FIG. 8A is a side view of a shaft member according to a third structural example of the present invention.

In the first and second structural examples, as the recesses 7, the inclined grooves 9a and 9b and the axial grooves 22 are given as examples. However, there may be formed the recess 7 having a shape other than the groove shape. FIG. 8A illustrates an example (third structural example) thereof, in which the dimples 32 serving as the recesses 7 are arranged while being dispersed in a partial region of an outer peripheral surface 31a of a shaft member 31. In this case, the plurality of dimples 32 and a surrounding region 33 thereof constitute a dynamic pressure generation portion 34. Accordingly, although not shown, in a state where the shaft member 31 is inserted into the inner periphery of the bearing member 3 illustrated in FIG. 1 and the shaft member 31 is rotated relatively to the bearing member 3, the dynamic pressure effect of the lubricating oil is caused by the dynamic pressure generation portion 34 in the radial bearing clearance filled with the lubricating oil. As a result, there is formed a radial bearing portion by which the shaft member 31 is supported in the radial direction with respect to the bearing member 3 in a non-contact manner.

Figure 8B:
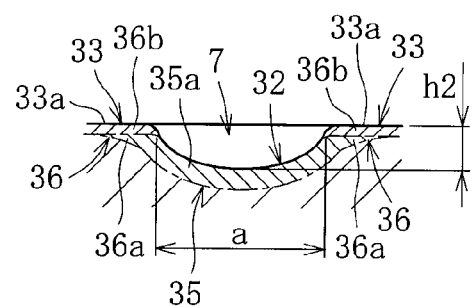
FIG. 8B is an enlarged view illustrating a sectional shape of a dimple formed in the shaft member.

The dimples 32 serving as the recesses 7 are formed by rolling in the same manner as that of the above-mentioned structural examples. The barreling is then applied to a region constituting the dynamic pressure generation portion 34. As a result, as illustrated in FIG. 8B, a first hardened layer 35a is formed in a surface layer portion 35 of the dimple 32 by rolling the dimple 32. Further, in an outermost layer portion of a surface layer portion 36 including a surface 33a of the surrounding region 33, a second hardened layer 36b is formed by the barreling. A hardness of the second hardened layer 36b formed in the surface layer portion 36 of the surrounding region 33 is higher by 50 Hv or more and 200 Hv or less than a hardness of the first hardened layers 35a formed on the surface layer portions 35 of the dimples 32. Note that, in this structural example, in a part of the surrounding region of the dimples 32 of the second hardened layer 36b formed in the surface layer portion 36 of the surrounding region 33 of the dimples 32, a first hardened layer 36a formed by the rolling remains.

Also in this structural example (third structural example), the dimples 32 are formed as the recesses 7 by the rolling. After that, by the barreling, an appropriate difference in hardness is provided between the surface layer portion 36 of the surrounding region 33 and the surface layer portion 35 of the dimple 32, thereby making it possible to increase a hardness of the surface 33a of the surrounding region 33 and to increase rolling workability of the dimples 32 and surface accuracy of the surface 33a of the surrounding region 33 constituting the bearing surface. Accordingly, the shaft member 31 for a fluid dynamic bearing device, having high bearing performance and wear resistance can be obtained.

Figure 8C:
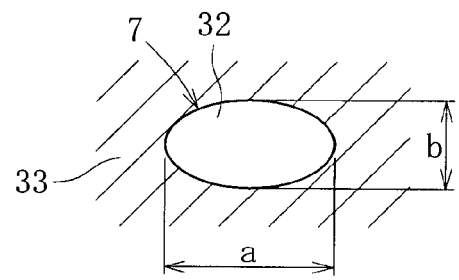
FIG. 8C is an enlarged view illustrating a planar shape of the dimple.

As a size of the dimple 32, as illustrated in FIG. 8C for example, a ratio a/d1 of a width a in a major axis direction of the dimple 32 with respect to an axial diameter d1 is preferably 0.1 or more and 0.4 or less. Further, a depth h2 of the dimple 32 is preferably, for example, about 1 to 10 times a width (radial clearance dimension) of the radial bearing clearance facing an outer peripheral surface 31a of the shaft member 31. Unlike dimples of a type which are provided to a shaft member, the dimples 32 of a size of this degree can constitute the dynamic pressure generation portion 34 causing a high dynamic pressure effect, and even in a case where the width of the radial bearing clearance is small, the dimples 32 can effectively function as oil reservoirs. Further, in view of torque reduction and rigidity enhancement, a ratio of a total area of regions where the dimples 32 are formed to an entire area of the surface 33a of the surrounding region 33 is preferably 10% to 70%. Further, as a surface shape of the dimple 32, for example, a ratio a/b of a major axis width a with respect to a minor axis width b is preferably within a range of 1.0 (complete-round shape) or more and 2.0 or less. However, in particular, even the dimple 32 assuming a surface shape out of the above-mentioned range can be formed without any problem.

Note that, in the above-mentioned structural examples (first to third structural examples), as the recesses 7, the inclined grooves 9a and 9b, the axial grooves 22, and the dimples 32 are given as examples. However, the present invention may also be applied to the recesses 7 having a shape other than those described above as long as the recesses 7 are recesses for generating the dynamic pressure effect of the lubricating oil in the bearing clearance such as the radial bearing clearance 6.

Hereinafter, a description is made of a second embodiment of the present invention with reference to FIGS. 9 to 16.

Figure 9:
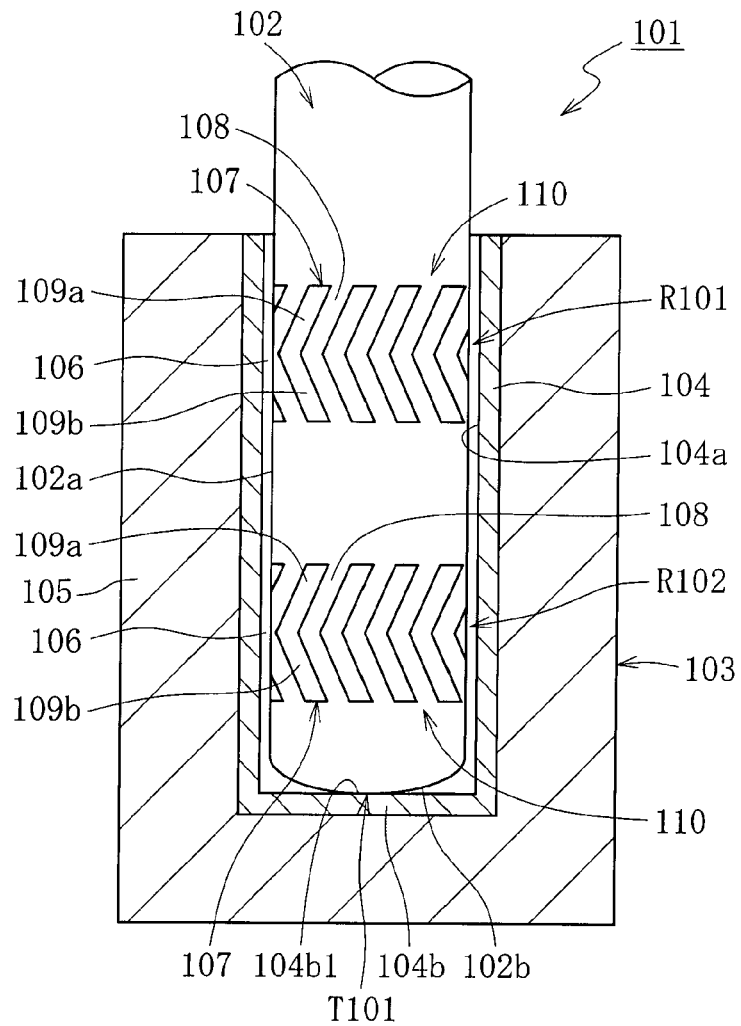
FIG. 9 is a sectional view of a fluid dynamic bearing device according to a second embodiment of the present invention.

FIG. 9 illustrates a sectional view of a fluid dynamic bearing device 101 according to the second embodiment of the present invention. In FIG. 9, the fluid dynamic bearing device 101 includes a shaft member 102 and a bearing member 103 having an inner periphery into which the shaft member 102 can be inserted.

In this embodiment, the bearing member 103 is a bottomed cylindrical body including an electroformed portion 104 and a molded portion 105. The electroformed portion 104 provided integrally with or separately from a master is injection-molded of a resin as an insert member in an integrated fashion. An inner peripheral surface 104a of the electroformed portion 104, which is opposed to an outer peripheral surface 102a of the shaft member 102 forms a complete-round shape.

The shaft member 102 is a shaft having a fixed diameter, and is made of, for example, metal materials having a relatively high workability (hardness of about 200 Hv or more and 400 Hv or less), such as various types of carbon steel, chrome steel, stainless steel, or a copper alloy.

In an entire surface or a partial region of the outer peripheral surface 102a of the shaft member 102, there are formed a plurality of recesses 107 for causing a dynamic pressure effect of a lubricating oil in a radial bearing clearance 106 between the outer peripheral surface 102a and the inner peripheral surface 104a of the electroformed portion 104. In this embodiment, each of the recesses 107 includes an inclined groove 109a and an inclined groove 109b which are inclined so as to be continuous with or adjacent to each other on one end side in a circumferential direction and so as to be away from each other at another end side in the circumferential direction. The plurality of recesses 107 assuming the above-mentioned shape are aligned at predetermined intervals in the circumferential direction to form a so-called herringbone shape. In this case, the recesses 107 (inclined grooves 109a and 109b) and a surrounding region 108 thereof constitute a dynamic pressure generation portion 110 for causing the dynamic pressure effect of the lubricating oil in the radial bearing clearance 106. Further, in this embodiment, the dynamic pressure generation portions 110 of the above-mentioned structure are provided in two positions away from each other in an axial direction.

One end surface 102b of the shaft member 102 forms a substantially spherical shape. In a state where the shaft member 102 is inserted into the inner periphery of the bearing member 103, the one end surface 102b abuts on an upper end surface 104b1 of a bottom portion 104b of the electroformed portion 104 opposed thereto.

A lubricating oil is supplied from the air release side of the radial bearing clearance 106 between the bearing member 103 and the shaft member 102. As a result, the fluid dynamic bearing device 101 having the bearing inner space including the radial bearing clearance 106 filled with the lubricating oil is achieved.

In the fluid dynamic bearing device 101 having the above-mentioned structure, at a time of relative rotation of the shaft member 102, the dynamic pressure effect of the lubricating oil is caused in the radial bearing clearance 106 between the dynamic pressure generation portions 110 and 110 provided to the outer peripheral surface 102a of the shaft member 102 and the inner peripheral surface 104a of the electroformed portion 104 corresponding to the dynamic pressure generation portions 110 and 110. As a result, there are formed a first radial bearing portion R101 and a second radial bearing portion R102 for supporting the shaft member 102 such that the shaft member 102 can relatively rotate in a radial direction.

Further, at the time of relative rotation of the shaft member 102, the one end surface 102b of the shaft member 102 is supported (pivotally supported) by the upper end surface 104b1 of the bottom portion 104b while brought into contact therewith. Accordingly, there is formed a thrust bearing portion T101 for supporting the shaft member 102 such that the shaft member 102 can relatively rotate in a thrust direction is formed.

Hereinafter, an example of manufacturing processes of the shaft member 102 is described with reference to FIGS. 10 to 12.

In this embodiment, the shaft member 102 is formed through a rolling process (d) of forming the recesses 107 by the rolling, a nitriding process (e) of nitriding at least the surrounding region 108 of the recesses 107 formed in the rolling process (d), and a barreling process (f) of barreling the surrounding region 108.

(d) Rolling Process

Figure 10:
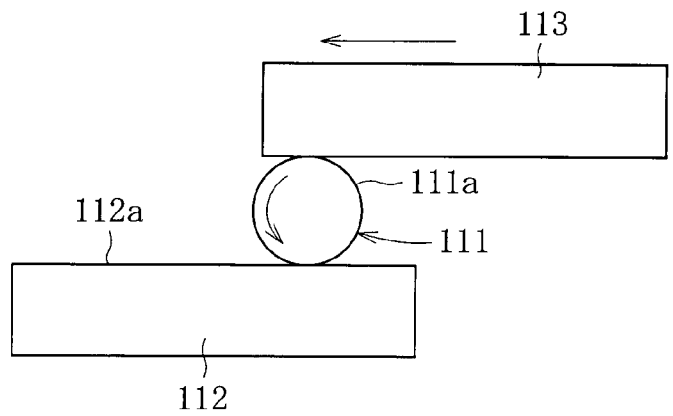
FIG. 10 is a view conceptually illustrating a process of rolling a recess in a shaft member for the fluid dynamic bearing device according to a first structural example of the second embodiment of the present invention.
Figure 11A:
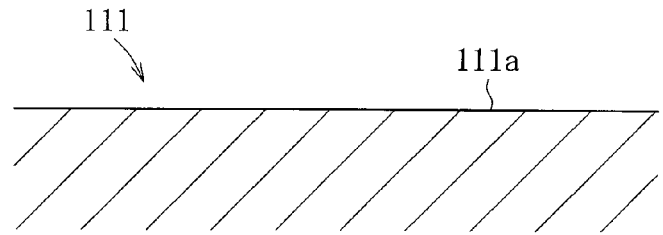
FIG. 11A is a sectional view of the vicinity of an outer peripheral surface layer portion of the shaft member before the rolling.

FIG. 10 is a view conceptually illustrating a process of forming the recesses 107 by rolling having the shape illustrated in FIG. 9 in an outer peripheral surface 111a of a shaft material 111 made of the above-mentioned materials. Of a pair of rolling dice 112 and 113 (flat dice in this illustrated example), an opposed surface 112a of the first rolling die 112 is provided with convex portions (not shown) having a shape corresponding to the recesses 107 to be formed by being transferred onto the shaft material 111. As illustrated in FIG. 11A, in a state before the rolling, the outer peripheral surface 111a of the shaft material 111 is smooth.

In a state where the shaft material 111 is sandwiched between the rolling dice 112 and 113, the second rolling die 113 relatively slide with respect to the first rolling die 112. Accordingly, the shaft material 111 is pressed and rolls on a convex portion-forming region of the first rolling die 112. As a result, from the first rolling die 112 side, the recesses 107 (dynamic pressure generation portion 110) of a shape illustrated in FIG. 9, for example, are formed on the shaft material 111 by the rolling.

Figure 11B:
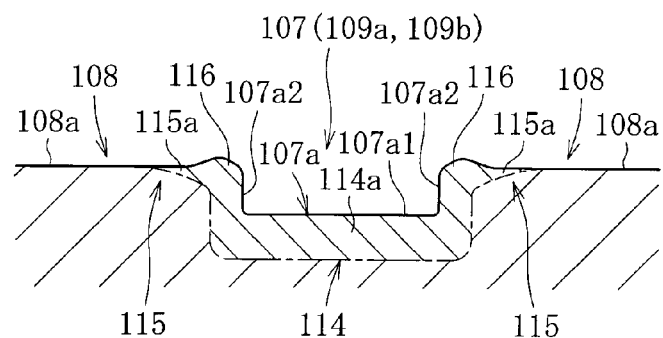
FIG. 11B is a sectional view of the vicinity of the surface layer portion of the recess and a surrounding region thereof after the rolling.
Figure 12:
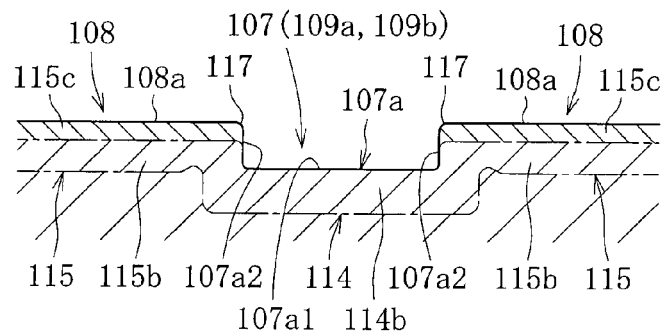
FIG. 12 is a sectional view of the recess and a surrounding region in the vicinity of a surface layer portion thereof after barreling.

In this case, as illustrated in FIG. 11B, in a surface layer portion 114 of the recess 107 formed in the outer peripheral surface 111a of the shaft material 111, a first hardened layer 114a is formed by the rolling. In this embodiment, at the same time, also in a partial region of a surface layer portion 115 of the surrounding region 108 of the recess 107, a first hardened layer 115a is formed by the rolling.

Further, along with the rolling, an original thickness portion of the recess 107 is pushed out to the circumference thereof. As a result, as illustrated in FIG. 11B, a prominence (bulged portion 116) is generated in a section close to the recess 107 of the surrounding region 108.

(e) Nitriding Process

Figure 11C:
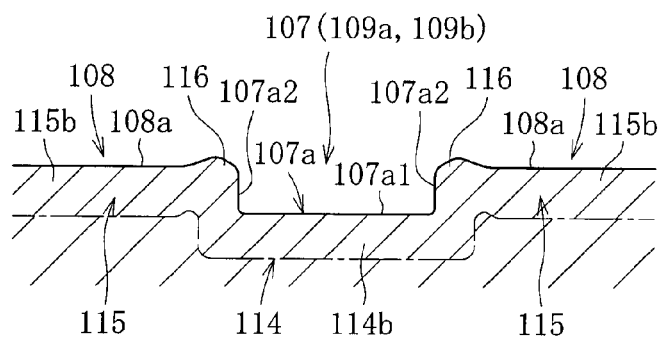
FIG. 11C is a sectional view of the vicinity of the surface layer portion of the recess and the surrounding region thereof after nitriding.

After forming the recesses 107 in the shaft material 111 by the rolling, the nitriding is applied to the shaft material 111. In this manner, nitrogen is allowed to be diffused to penetrate into the surface layer portion 114 of the recess 107 and the inner space of the surface layer portion 115 of the surrounding region 108, thereby forming a nitride from material metal and nitrogen in each of the surface layer portions 114 and 115. As a result, as illustrated in FIG. 11C, for example, a nitride layer 114b is formed in the surface layer portion 114 of the recess 107 including the first hardened layer 114a. Further, in the surface layer portion 115 of the surrounding region 108 including the first hardened layer 115a, a nitride layer 115b is formed. Note that, as a specific means for the nitriding (including soft nitriding), gas nitriding or a plasma nitriding may be used, for example, and as a specific means for the soft nitriding, gas soft nitriding or salt-bath soft nitriding may be used, for example.

In this case, a thickness of the nitride layer 115b constituting the surface layer portion 115 has an extremely small thickness, such as several μm to dozen μm. Further, a hardness thereof (surface hardness in this case) is 600 Hv to 1000 Hv. The nitride layer 114b has the same thickness and hardness.

Further, the "nitride layer thickness" herein refers to a depth (thickness) of a compound layer which can be relatively easily distinguished from other layers of the compound layer in which the nitride mainly exists and the diffusion layer in which nitrogen is diffused to penetrate in ground metal.

The nitriding is normally performed at a temperature of 500° C. to 600° C. Accordingly, deformation of the shaft material 111 (shaft member 102) at a time of thermal treatment is extremely smaller than that in thermal treatments such as quenching or carburization. Therefore, deformation at the time of thermal treatment and variations in shape of the recesses 107 (inclined grooves 109a and 109b) caused by finish grinding are suppressed to minimum, and the recesses 107 (dynamic pressure generation portions 110) having high dimensional accuracy can be provided to the shaft member 102. Thus, in a case where the shaft member 102 is used while being incorporated into the fluid dynamic bearing device 101 illustrated in FIG. 9, the dynamic pressure effect of the lubricating oil caused in the radial bearing clearance 106 can be enhanced. Further, the finish grinding or the like of the outer peripheral surface 111a becomes unnecessary, so a process thereof can be eliminated to achieve cost reduction.

Further, at the time of rotation of the shaft member 102, or in particular at start or stop, a surface 108a of the surrounding region 108 of the recesses 107 may be brought into slide contact with the inner peripheral surface 104a of the electro-formed portion 104 opposed thereto. As described above, the surface layer portion 115 of the surrounding region 108 is formed of the nitride layer 115b, whereby the hardness of the surface layer portion 115 including the bearing surface (surface 108a) can be increased. As a result, sliding wear of the shaft member 102 is reduced, in other words, abrasion of the recesses 107 is suppressed, and a high dynamic pressure effect can be exerted stably for a long period of time.

Further, the present invention is characterized in that the recesses 107 for generating a dynamic pressure are provided on the shaft member 102 side. Accordingly, it is possible to meet a demand for downsizing of the fluid dynamic bearing device 101 involved in recent downsizing of information equipment without deteriorating workability of the recesses 107. The shaft member 102 currently having a shaft diameter of only about several mm may further be downsized along with the downsizing of the fluid dynamic bearing device 101. As described above, when the extremely thin nitride layer 115b can be formed, a ratio of the hardened layer (nitride layer 115b in this case) to the unhardened layer of the entire shaft member 102 is suppressed to minimum, and tenacity (fatigue resistance characteristics) of the shaft member 102 itself can be maintained high. Specifically, a ratio t/d2 of a thickness t of the nitride layer 115b to a shaft diameter d2 of the shaft member 102 is set to 0.05 or smaller, whereby the tenacity of the shaft member 102 can be maintained high with a hardness of the surface 108a of the surrounding region 8 serving as the bearing surface being increased.

Further, in this embodiment, the shaft material 111 (shaft member 102) is made of a metal material having a hardness of 400 Hv or less, so at the time of rolling, workability of the recesses 107 can be enhanced. Further, deformation resistance at the time of rolling is also small, so wear due to continuous use of the rolling dice 112 and 113 can be suppressed to minimum, thereby extending a working life of the rolling dice 112 and 113.

(f) Barreling Process

In this embodiment, after the nitriding is applied to the shaft material 111, the barreling (for example, centrifugal barreling, fluid barreling, or barreling obtained by combining those) is applied to the shaft material 111. As a result, the bulged portions 116 formed on the surrounding region 108 is eliminated by being crushed, thereby making the surface 108a of the surrounding region 108 to be a uniformly smooth surface as illustrated, for example, in FIG. 12. Further, in this case, of the surface 108a of the surrounding region 108, at least in a partial region (for example, a region where the bulged portions 116 are formed), a processed surface (polished surface) is formed by the barreling.

In this case, as a medium to be used, in viewpoints of effectiveness of the barreling, there is used a medium having a certain size compared to a size of the shaft member 102. Accordingly, impact of the medium is not caused on a surface 107a (bottom surfaces 107a1 and inner side surface 107a2) of the recess 107, and the medium impacts on the surface 108a of the surrounding region 108. As a result, the hardening owing to the impact with respect to the medium is caused on the surface layer portion 115 of the surrounding region 108. In the region 108, a second hardened layer 115c is formed by to the barreling (see FIG. 12). In this embodiment, the surface layer portion 115 of the surrounding region 108 includes the nitride layer 115b formed by the nitriding and the second hardened layer 115c formed by the barreling. The second hardened layer 115c is formed so as to overlap with an outermost surface layer portion of the nitride layer 115b formed prior thereto.

As described above, after nitriding the shaft material 111 (shaft member 102) in which the recesses 107 are formed by the rolling, the barreling is applied to the shaft material 111, thereby obtaining the shaft member 102 having the structure in which the nitride layer 115b and the second hardened layer 115c are formed in the surface layer portion 115 of the surrounding region 108. As a result, the hardness of the surface 108a of the surrounding region 108 serving as the bearing surface can be surely increased, and smoothness (flatness) of the surface 108a and accuracy of form of the recesses 107 can also be increased. In particular, like in this embodiment, by performing the barreling after the nitriding, the bulged portions 116 can be eliminated with an impression of the impact with respect to the shaft material 111 or deformation thereof being suppressed as much as possible, thereby enhancing finishing accuracy of the bearing surface (surface 108a).

Further, like in this embodiment, regarding the shaft material 111 formed of a material having a hardness of 400 Hv or less (the shaft member 102 having a structure in which a hardness of lower layer regions of the surface layer portions 114 and 115 is 400 Hv or less), at the time of forming the recesses 107 by rolling, a size of the bulged portions 116 formed in the surrounding region 108 becomes smaller and a shape thereof tends to be a shape allowing easy removal thereof by the barreling. Accordingly, also for this reason, the finishing accuracy of the bearing surface (surface 108a) can be enhanced.

Further, like in this embodiment, when the groove-like recess 107 (inclined grooves 109a and 109b) is formed by the rolling, burrs may be generated on a circumferential portion 117 of the recess 107. However, by applying the barreling by using a medium of an appropriate size, the burrs are eliminated, or the circumferential portion 117 of the recess 107 can be appropriately chamfered. As a result, at a time of relative rotation of the shaft member 102, wear of the inner peripheral surface 104a of the electroformed portion 104 serving as a sliding counter surface is reduced to minimum, or damages such as galling are avoided, thereby making it possible to enhance durability of the bearing.

As a medium used for the barreling, there may be used a medium made of various materials such as metal, ceramic, or a resin. However, in view of forming the second hardened layer 115c by the barreling, the metal or ceramics medium having relatively high hardness is preferably used. Further, in view of maintaining the shape of the recess 107 with high accuracy, a medium of a size such that the medium is not brought into contact with the bottom surface 107a1 of the recess 107 is preferable. Other than the spherical shape, for example, a medium having various shapes such as a polygonal shape or a bar shape may be used.

Further, in this embodiment, the inner peripheral surface of the bearing member 103, for forming the radial bearing clearance 106 between itself and the recess 107 (inclined grooves 109a and 109b) formed in the shaft member 102 by rolling is formed by the inner peripheral surface 104a of the electroformed portion 104. Accordingly, the inner peripheral surface 104a can be formed with high accuracy, thereby making it possible to set the radial bearing clearance 106 to be narrower. Further, depending on bearing performance to be required, there is no need of aligning the plurality of recesses 107 in complicated shapes (such as herringbone shape) as long as the width of the radial bearing clearance 106 can be managed to be small with high accuracy. For example, even with a dynamic pressure generation portion including the recesses 107 of a simple shape (shape which can be more easily processed) such as axial grooves 122 or dimples 132 described later, a high dynamic pressure effect can be caused in the radial bearing clearance.

In the above description, a structure (first structural example) of the fluid dynamic bearing device 101 according to the second embodiment of the present invention and the shaft member for the fluid dynamic bearing device 101 is described. However, the shaft member according to the present invention is not limited to this structure and other structures may be adopted. Hereinafter, a shaft member according to another structure (second structural example) of the second embodiment is described with reference to FIGS. 13 to 15. Further, a shaft member according to a third structural example is described with reference to FIG. 16.

Figure 13A:
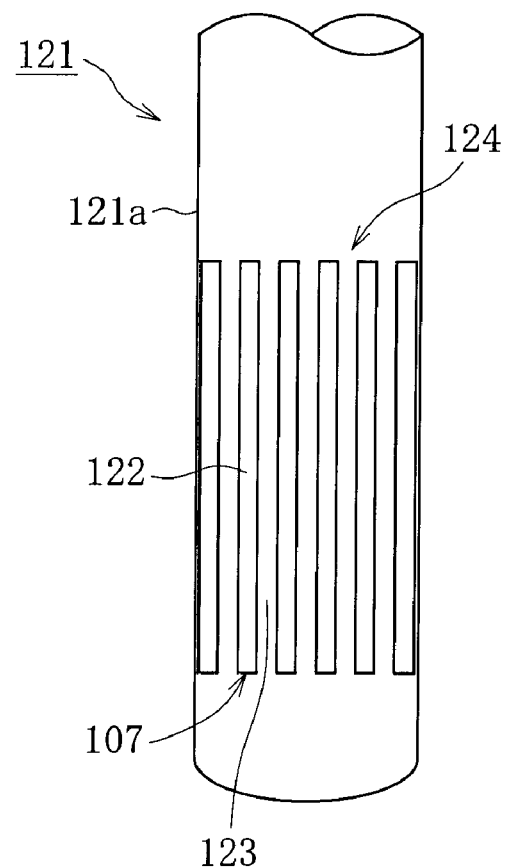
FIG. 13A is a side view of a shaft member according to a second structural example of the present invention and FIG. 13B is a sectional view taken perpendicularly to an axis of the shaft member.
Figure 13B:
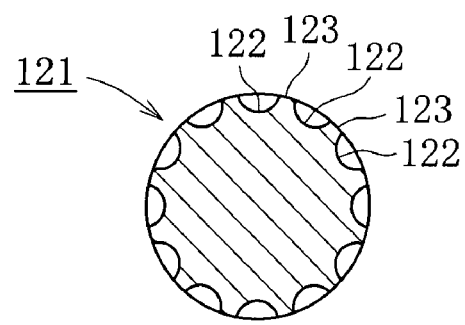

In the above-mentioned first structural example, there is exemplary illustrated a case where each of the recesses 107 is formed of the inclined groove 109a and the inclined groove 109b and the recesses 107 are aligned to form the herringbone shape. However, as illustrated in FIG. 13A, for example, the axial grooves 122 may be formed in an outer peripheral surface 121a of a shaft member 121, as the recesses 107. In this case, the plurality of axial grooves 122 are formed at predetermined intervals in the circumferential direction as illustrated in FIG. 13B. The axial grooves 122 and a surrounding region 123 thereof constitute a dynamic pressure generation portion 124. Accordingly, although not shown, in a state where the shaft member 121 is inserted into the inner periphery of the bearing member 103 illustrated in FIG. 9 and the shaft member 121 is rotated relatively to the bearing member 103, the dynamic pressure effect of the lubricating oil is caused by the dynamic pressure generation portion 124 in the radial bearing clearance filled with the lubricating oil. As a result, there is formed a radial bearing portion by which the shaft member 121 is supported in the radial direction with respect to the bearing member 103 in a non-contact manner.

Figure 14A:
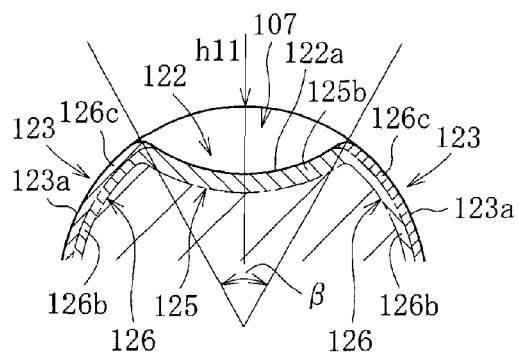
FIG. 14A is an enlarged sectional view illustrating one shape of an axial groove formed in the shaft member and FIGS. 14B to 14D are enlarged sectional views illustrating other shapes of the axial groove.

The shaft member 121 having the axial grooves 122 is formed through, similarly to the above embodiment, the (d) rolling process, the (e) nitriding process, and the (f) barreling process. As a result, as illustrated in FIG. 14A, for example, a nitride layer 125b is formed by the nitriding in a surface layer portion 125 of each of the axial grooves 122. Further, a nitride layer 126b is formed by the nitriding in a surface layer portion 126 of the surrounding region 123 of the axial grooves 122, and in an outermost surface layer portion of the surface layer portion 126 including a surface 123a, a second hardened layer 126c is formed by the barreling. On the surface 123a, a processed surface is formed by the barreling.

Also in this structural example, in the surface layer portion 125 of the axial groove 122 formed by the rolling and in the surface layer portion 126 in the surrounding region 123 of the axial groove 122, the nitride layers 125b and 126b formed by the nitriding are provided, respectively, thereby making it possible to enhance hardness of the surface 123a of the surrounding region 123, which constitutes the bearing surface. Further, by applying barreling in addition to the nitriding, surface accuracy of the surface 123a of the surrounding region 123 can be enhanced. Accordingly, the shaft member 121 for a fluid dynamic bearing device, having high bearing performance and wear resistance can be obtained.

Figure 14B:
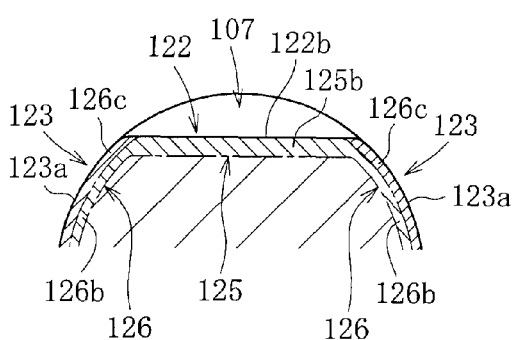
Figure 14C:
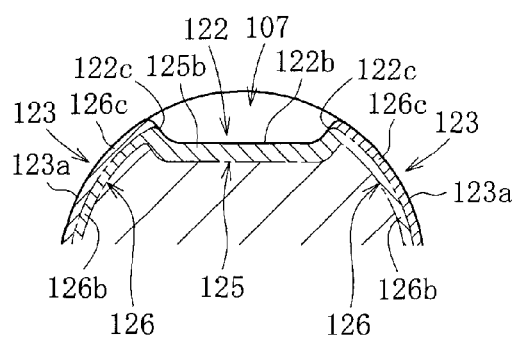
Figure 14D:
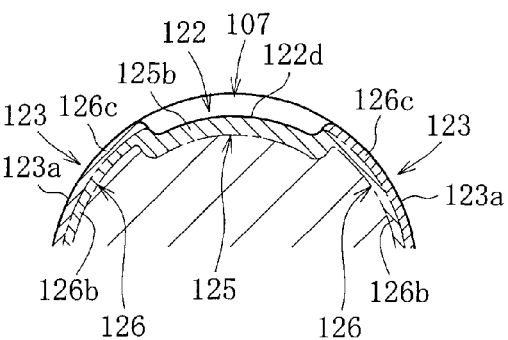

As the axial grooves 122 which can be formed, there may be considered the axial grooves 122 having, as illustrated in FIG. 14A, a curved surface 122a whose section assumes a circular arc shape, which is convex toward an axial center, or as illustrated in FIG. 14B, for example, a flat surface 122b whose section assumes a chord with respect to an arc of the outer peripheral surface 121a. Alternatively, there may also be formed, as illustrated in FIG. 14C, the axial groove 122 having a structure in which raised portions 122c are provided to both ends in the circumferential direction of the flat surface 122b so as to form a step between the flat surface 122b and the outer peripheral surface 121a, or as illustrated in FIG. 14D, the axial groove 122 having a structure in which a groove depth is constant in the axial direction and the circumferential direction and having a curved surface 122d whose section is convex toward an outer diameter side.

When a consideration is made for the dynamic pressure effect of the lubricating oil, the number of the axial grooves 122 formed in the outer periphery of the shaft member 121 is preferably three or more. Further, for the same reason, an angle of circumference $\beta$ indicating a circumferential width of the axial groove 122 is preferably 10° or more and 60° or less, and a groove depth h11 of the axial groove 122 is preferably 2 µm to 20 µm. Further, in view of both torque reduction and rigidity enhancement, a ratio of an entire area of the axial grooves 122 to an entire area of the surface 123a of the surrounding region 123 is preferably 15% to 70%. (When axial lengths of the axial grooves 122 are uniform, the above-mentioned area ratio is expressed by a formula $\{\beta/(360°-\beta)\}$.)

Figure 15:
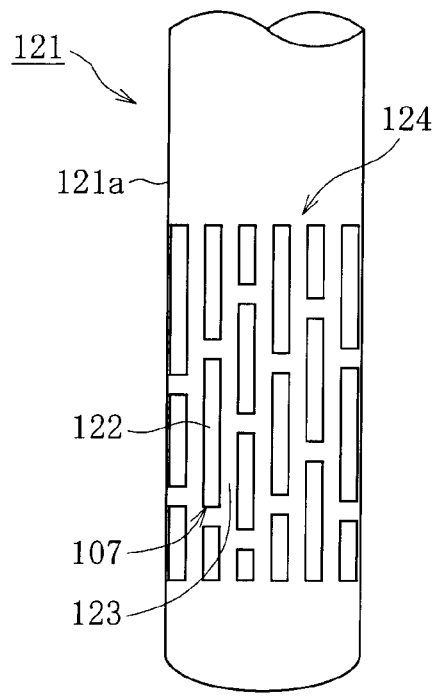
FIG. 15 is a side view illustrating a shaft member according to a modification example of the second structural example of the present invention.

Further, FIG. 13 exemplary illustrate the structure in which the plurality of axial grooves 122, extending in the axial direction in an entire area in which the radial bearing portion (dynamic pressure generation portion 124) is to be formed, are arranged in parallel to each other in the circumferential direction. However, other than this structure, there may be employed a structure in which, as illustrated in FIG. 15, for example, the axial grooves 122 are provided at intervals in the axial direction. Other constructional details conform to those of the case where the axial grooves 122 extending in the entire axial length of the dynamic pressure generation portion 24, so descriptions of those are omitted.

Figure 16A:
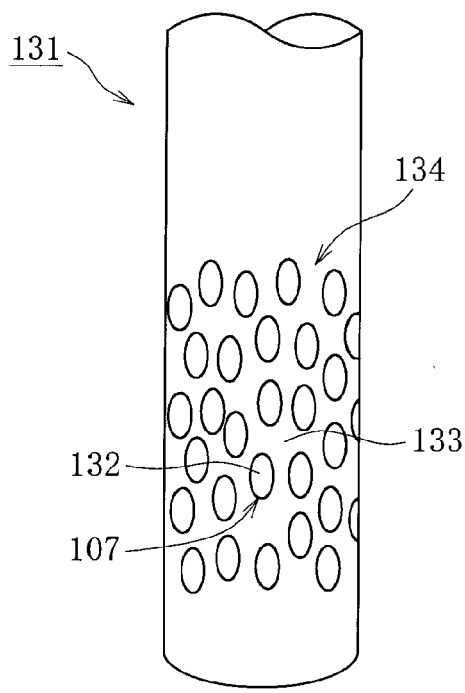
FIG. 16A is a side view of a shaft member according to a third structural example of the present invention.

In the first and second structural examples, as the recesses 107, the inclined grooves 109a and 109b and the axial grooves 122 are given as examples. However, there may be formed the recess 107 having a shape other than the groove shape. FIG. 16A illustrates an example (third structural example) thereof, in which the plurality of dimples 132 serving as the recesses 107 are arranged while being dispersed in a partial region of an outer peripheral surface 131a of a shaft member 131. In this case, the plurality of dimples 132 and a surrounding region 133 thereof constitute a dynamic pressure generation portion 134. Accordingly, although not shown, in a state where the shaft member 131 is inserted into the inner periphery of the bearing member 103 illustrated in FIG. 9 and the shaft member 131 is rotated relatively to the bearing member 103, the dynamic pressure effect of the lubricating oil is caused in the radial bearing clearance filled with the lubricating oil by the dynamic pressure generation portion 134. As a result, there is formed a radial bearing portion by which the shaft member 131 is supported in the radial direction with respect to the bearing member 103 in a non-contact manner.

Figure 16B:
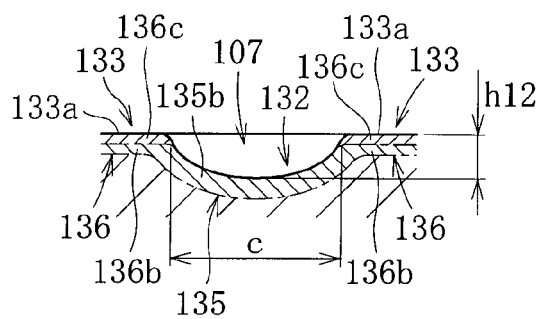
FIG. 16B is an enlarged view illustrating a sectional shape of a dimple formed in the shaft member.

The shaft member 131 having the dimples 132 is formed through, similarly to the above embodiment, the (d) rolling process, the (e) nitriding process, and the (f) barreling process. As a result, as illustrated in FIG. 16B, for example, a nitride layer 135b is formed by the nitriding in a surface layer portion 135 of the dimple 132. Further, a nitride layer 136b is formed by the nitriding in a surface layer portion 136 of the surrounding region 133 of the dimples 132, and in an outermost surface layer portion of the surface layer portion 136 including a surface 133a, a second hardened layer 136c is formed by the barreling. On the surface 133a, a processed surface is formed by the barreling.

Also in this structural example, in the surface layer portion 135 of the dimple 132 formed by the rolling and in the surface layer portion 136 in the surrounding region 133 of the dimple 132, the nitride layers 135b and 136b formed by the nitriding are provided, respectively, thereby making it possible to enhance hardness of the surface 133a of the surrounding region 133, which constitutes the bearing surface. Further, by applying the barreling in addition to the nitriding, surface accuracy of the surface 133a of the surrounding region 133 can be enhanced. Accordingly, the shaft member 131 for a fluid dynamic bearing device, having high bearing performance and wear resistance can be obtained.

Figure 16C:
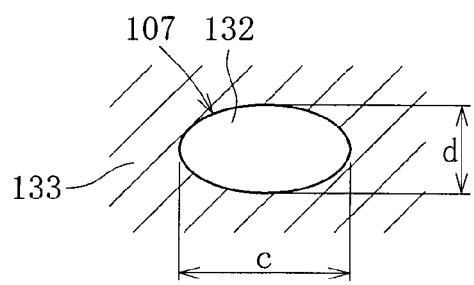
FIG. 16C is an enlarged view illustrating a planar shape of the dimple.

As a size of the dimple 132, as illustrated in FIG. 16C for example, a ratio c/d2 of a width c in a major axis direction of the dimple 132 with respect to an axial diameter d2 is preferably 0.1 or more and 0.4 or less. Further, a depth h12 of the dimple 132 is preferably, for example, about 1 to 10 times a width of the radial bearing clearance facing the outer peripheral surface 131a of the shaft member 131. Unlike dimples of a type which are provided to a shaft member, the dimples 132 of a size of this degree can constitute the dynamic pressure generation portion 134 causing a high dynamic pressure effect, and even in a case where the width of the radial bearing clearance is small, the dimples 132 can effectively function as oil reservoirs. Further, in view of torque reduction and rigidity enhancement, a ratio of a total area of regions where the dimples 132 are formed to an entire area of the surface 133a of the surrounding region 133 is preferably 10% to 70%. Further, as a shape of the dimple 132, for example, a ratio c/d of a major axis width c with respect to a minor axis width d is preferably within a range of 1.0 (complete-round shape) or more and 2.0 or less in practical use. However, in particular, even the dimple 132 assuming a surface shape out of the above-mentioned range can be formed without any problem.

Note that, in the above-mentioned structural examples (first to third structural examples), as the recesses 107, the inclined grooves 109a and 109b, the axial grooves 122, and the dimples 132 are given as examples. However, the present invention may also be applied to the recesses 107 having a shape other than those described above as long as the recesses 107 are recesses for generating the dynamic pressure effect of the lubricating oil in the bearing clearance such as the radial bearing clearance 106.

Further, in the above-mentioned structural example, there is exemplary described a case where, regardless of a specific shape of the recess 107, the (e) nitriding is applied to the shaft material 111 after the rolling, and the (f) barreling is then applied thereto. However, the order of the processes is not obligatory. For example, after forming the recesses 107 by the rolling, the processes may be performed in an order of the (f) barreling and the (e) nitriding. Further, depending on a material of the shaft material 111 (shaft member 102) to be used, the bulged portions 116 formed at the time of (d) rolling process may not grow to have such a size (height) that is necessarily eliminated in some cases. In this case, the (f) barreling process may be omitted.

The shaft member for a fluid dynamic bearing device according to the above-mentioned first and second embodiments and the fluid dynamic bearing device including the shaft member can be used while being incorporated in a spindle motor for information equipment, for example. Hereinafter, a description is made of a case (third embodiment) where the shaft member 31 for a fluid dynamic bearing device according to the first embodiment is applied to a spindle for the motor described above with reference to FIG. 17. Note that, parts and members having the same structures and functions as those of the structural examples illustrated in FIGS. 1 to 8 are denoted by the same reference symbols and repetitive description thereof is omitted.

Figure 17:
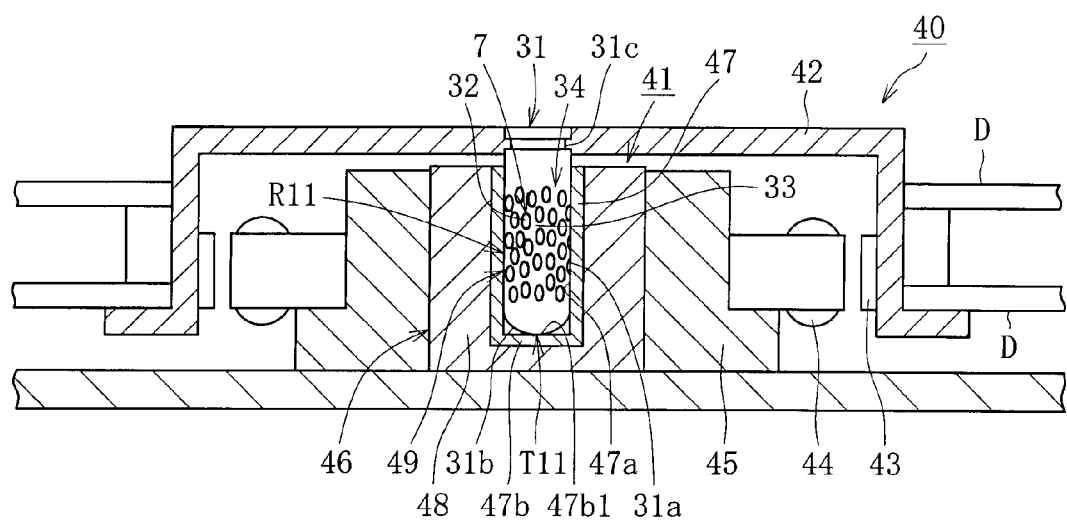
FIG. 17 is a sectional view of a motor for information equipment, into which a fluid dynamic bearing device according to a third embodiment of the present invention is incorporated.

FIG. 17 illustrates a sectional view of a motor 40 in which a fluid dynamic bearing device 41 according to a third embodiment of the present invention is incorporated. The motor 40 is used as a spindle motor for a disk drive device such as an HDD, for example, and includes the fluid dynamic bearing device 41 for rotatably supporting the shaft member 31 in a non-contact manner, a rotor (disk hub) 42 mounted to the shaft member 31, a stator coil 43 and a rotor magnet 44 opposed to each other through a radial gap, for example, and a bracket 45. The stator coil 43 is mounted to an outer periphery of the bracket 45, and the rotor magnet 44 is mounted to an inner periphery of the disk hub 42. The disk hub 42 holds one or a plurality of (two in FIG. 17) disks D such as magnetic disks. When the stator coil 43 is electrified, by an electromagnetic force between the stator coil 43 and the rotor magnet 44, the rotor magnet 44 rotates, thereby allowing the disk hub 42 and the disks D held by the disk hub 42 to rotate together with the shaft member 31.

In this embodiment, the fluid dynamic bearing device 41 includes a bearing member 46 and the shaft member 31 to be inserted into an inner periphery of the bearing member 46. The bearing member 46 includes an electroformed portion 47 having a bottomed cylindrical shape whose one end is open, and a molded portion 48 integrated with the electroformed portion 47. The bearing member 46 is injection molded integrally with the molded portion 48 from a resin with, for example, the electroformed portion 47 integral with or separate from a master serving as an insert part.

In the outer peripheral surface 31a of the shaft member 31, as illustrated in FIG. 17, the plurality of dimples 32 serving as the recesses 7 are formed. Further, one end surface 31b of the shaft member 31 has a spherical shape. In a state where the shaft member 31 is inserted into the inner periphery of the bearing member 46, the one end surface 31b abuts on an upper end surface 47b1 of a bottom portion 47b of the electroformed portion 47 which is opposed thereto. Further, of the outer peripheral surface 31a of shaft member 31, an end portion region serving as a fixing region for the disk hub 42 has an annular groove 31c formed therein. The shaft member 31 having the annular groove 31c is formed integrally with the disk hub 42 by molding with the shaft member 31 being used as the insert part, for example. The annular groove 31c functions to prevent removal of the disk hub 42 from the shaft member 31. Other constructional details conform to the description of the above embodiments, so descriptions of those are omitted.

The shaft member 31 structured as described above is inserted into the inner periphery of the bearing member 46, and the lubricating oil is supplied to an inner space of the bearing member 46. As a result, there is achieved the fluid dynamic bearing device 41 having a structure in which a gap between the inner peripheral surface 47a of the electroformed portion 47 and the upper end surface 47b1 of the bottom portion 47b, and the outer peripheral surface 31a of the shaft member 31 opposed to those, and the bearing inner space including the dimples 32, which are formed in the shaft member 31, are filled with the lubricating oil.

In the fluid dynamic bearing device 41 structured as described above, at the time of rotation of the shaft member 31, a radial bearing clearance 49 is formed between the dynamic pressure generation portion 34 formed on the outer peripheral surface 31a of the shaft member 31 and the inner peripheral surface of the bearing member 46 (complete-round inner peripheral surface 47a of electroformed portion 47) opposed thereto. Along with the rotation of the shaft member 31, the lubricating oil of the radial bearing clearance 49 causes the dynamic pressure effect by the dynamic pressure generation portion 34, so the pressure increases. As a result, a radial bearing portion R11 for supporting the shaft member 31 rotatably in the radial direction is formed. At the same time, between the one end surface 31b of the shaft member 31 and the upper end surface 47b1 of the electroformed portion 47 opposed thereto, a thrust bearing portion T11 for supporting the shaft member 31 rotatably in the thrust direction is formed.

Accordingly, in the fluid dynamic bearing device 41 of this embodiment, sliding wear between the shaft member 31 and the bearing member 46 can be reduced. Therefore, a situation in which the dynamic pressure effect caused in the radial bearing clearance 49 is reduced due to wear of the dimples 32 provided to the shaft member 31 or the surrounding region 33 thereof can be avoided as much as possible, thereby exerting stable bearing performance for a long period of time.

Further, by providing the dynamic pressure generation portion 34 (recesses 7 for causing dynamic pressure effect) on the shaft member 31 side, the processing is easier than in the case where the dynamic pressure generation portion is provided on the bearing member 46 side. Accordingly, the requirements for the downsizing of the motor can be easily met.

Hereinabove, an example (third embodiment) of a case where the shaft member for a fluid dynamic bearing device according to the first embodiment of the present invention is applied to a spindle for a motor is described. However, as a matter of course, also in a case where the shaft member for a fluid dynamic bearing device (shaft member 131 of FIG. 16, for example) according to the second embodiment of the present invention is applied thereto in place of the shaft member 31 of FIG. 17, the same operational effects as described above can be obtained.

Note that, in each of the above embodiments (first to third embodiments), there is provided the example in which the bearing member 3, 103, 46 includes the electroformed portion 4, 104, 47 and the resin molded portion 5, 105, 48. However, this structure is not obligatory. For example, in stead of the electroformed portion 4, 104, 47, the bearing member can be formed by using a sleeve body made of a sintered metal. Further, the bearing member 3, 103, 47 may be integrally formed of a metal material, or the bearing member 3, 103, 47 may be integrally formed of a resin composition having increased sliding property and wear resistance. Alternatively, the bracket 45 which is a member on the motor 40 side may be integrally formed of the same material (such as metal or resin) as that of the bearing member 46.

Note that, each of FIGS. 1, 9, and 17 illustrates the example in which the thrust bearing portion T1, T101, T11 is formed of a so-called pivot bearing. However, the present invention may also be applied to a dynamic pressure bearing having a structure in which the shaft member 2, 102 is supported in the thrust direction by dynamic pressure generation means such as dynamic pressure grooves in the non-contact manner. In this case, although not shown, for example, the shaft member 2 according to the first embodiment of the present invention is provided with a flange portion projecting to the outer diameter side of the shaft member 2, an end surface of the flange portion is provided with recesses for generating the dynamic pressure, such as inclined grooves or dimples, formed by the rolling, and the barreling is then applied thereto, thereby making it possible to impart an appropriate hardness difference (50 Hv or more and 200 Hv or less) between the recesses and the surrounding region thereof. Alternatively, although not shown, the shaft member 102 according to the second embodiment of the present invention is provided with a flange portion projecting to the outer diameter side of the shaft member 102, an end surface of the flange portion is provided with recesses for generating the dynamic pressure, such as inclined grooves or dimples, formed by the rolling, and the nitriding is then applied thereto, thereby making it possible to increase the hardness of a surface serving as the thrust bearing surface (surface of surrounding region of recesses).

Further, in the above embodiments, as a fluid filling the inside of the fluid dynamic bearing device 1, 101, 41, for causing the dynamic pressure effect in the radial bearing clearance or the like, the lubricating oil is taken as an example. However, other than that, a fluid which may cause the dynamic pressure effect in the bearing clearance, for example, a gas such as air, a lubricant having fluidity, such as a magnetic fluid, or a lubricating grease may be used.

The invention claimed is:

1. A shaft member for a fluid dynamic bearing device, comprising a recess for causing a dynamic pressure effect of a fluid in a bearing clearance, which is formed thereon by rolling,
   a surface layer portion of the recess and a surface layer portion of a surrounding region of the recess comprise a nitride layer, in which nitrogen is diffused and penetrated in a material of the shaft member, formed by nitriding after the rolling,
   a first work hardened layer that is a layer in which work hardening has been caused by the rolling is formed so as to overlap with an outermost surface layer portion of the nitride layer in the recess, and
   a second work hardened layer that is a layer in which work hardening has been caused by barreling is formed so as to overlap with an outermost surface layer portion of the nitride layer in the surrounding region of the recess,
   the hardness of an entire lower layer region of the surface layer portion is equal to or less than 400 Hv.

2. The fluid dynamic bearing device comprising the shaft member for the fluid dynamic bearing device according to claim 1.

3. A shaft member for a fluid dynamic bearing device according to claim 1, wherein barreling is performed by using a medium having a size that prevents the medium from being brought into contact with a bottom surface of the recess, thereby
   the second work hardened layer is formed so as to overlap with an outermost surface layer portion of the nitride layer in surrounding region of the recess except the bottom surface portion of the recess.

4. A shaft member for a fluid dynamic bearing device according to claim 1, wherein a ratio of a thickness of the nitride layer to a shaft diameter of the shaft member is set to 0.05 or less.

* * * * *